United States Patent
Bhola et al.

(10) Patent No.: US 9,853,254 B2
(45) Date of Patent: Dec. 26, 2017

(54) THIN FILM ELECTROCHEMICAL CELL WITH A POLYMER DOUBLE SEAL

(71) Applicant: ELECTROVAYA INC., Mississauga (CA)

(72) Inventors: Rakesh Bhola, Mississauga (CA); Rajshekar Das Gupta, Toronto (CA); Sankar Das Gupta, Mississauga (CA)

(73) Assignee: ELECTROVAYA INC., Mississauga (CA)

( * ) Notice: Subject to any disclaimer, the term of this patent is extended or adjusted under 35 U.S.C. 154(b) by 399 days.

(21) Appl. No.: 14/370,753

(22) PCT Filed: Jan. 7, 2013

(86) PCT No.: PCT/CA2013/000006
§ 371 (c)(1),
(2) Date: Jul. 3, 2014

(87) PCT Pub. No.: WO2013/102269
PCT Pub. Date: Jul. 11, 2013

(65) Prior Publication Data
US 2014/0363721 A1    Dec. 11, 2014

Related U.S. Application Data

(60) Provisional application No. 61/631,453, filed on Jan. 5, 2012, provisional application No. 61/631,457, filed on Jan. 5, 2012.

(51) Int. Cl.
*H01M 10/50*    (2006.01)
*H01M 2/08*    (2006.01)
(Continued)

(52) U.S. Cl.
CPC .......... *H01M 2/08* (2013.01); *H01M 2/0267* (2013.01); *H01M 2/0277* (2013.01);
(Continued)

(58) Field of Classification Search
CPC .... H01M 2/08; H01M 2/0267; H01M 2/0277; H01M 2/0284; H01M 2/348; H01M 10/617
See application file for complete search history.

(56) References Cited

U.S. PATENT DOCUMENTS 3,237,078 A   2/1966   Mallory
3,393,555 A   7/1968   Flannelly
(Continued)

OTHER PUBLICATIONS

PCT International Search Report for PCT Counterpart Application No. PCT/CA2013/000006, 5 pgs., (dated Feb. 21, 2013).
(Continued)

*Primary Examiner* — Jane Rhee
(74) *Attorney, Agent, or Firm* — McAndrews, Held & Malloy, Ltd.

(57) ABSTRACT

A double-sealed thin film electrochemical pouch cell, comprising a cathode current collector, a cathode, an electrolyte, an anode, and an anode current collector, which is double-sealed by a first inner laminate layer forming a primary seal covered by a second outer polymer layer forming a secondary seal. The second outer polymer layer comprises embedded particles to increase the thermal conductivity of the second outer polymer layer.

26 Claims, 8 Drawing Sheets

(51) Int. Cl.
*H01M 2/02* (2006.01)
*H01M 2/34* (2006.01)
*H01M 10/617* (2014.01)

(52) U.S. Cl.
CPC ......... *H01M 2/0287* (2013.01); *H01M 2/348* (2013.01); *H01M 10/617* (2015.04)

(56) References Cited

U.S. PATENT DOCUMENTS

| | | |
|---|---|---|
| 3,852,117 A | 12/1974 | Fraioli |
| 4,154,902 A | 5/1979 | Schwartz |
| 4,169,919 A | 10/1979 | Topouzian |
| 4,996,129 A | 2/1991 | Tuck |
| 5,314,765 A | 5/1994 | Bates |
| 5,336,573 A | 8/1994 | Zuckerbrod et al. |
| 5,338,625 A | 8/1994 | Bates et al. |
| 5,362,581 A | 11/1994 | Chang et al. |
| 5,411,592 A | 5/1995 | Ovshinsky et al. |
| 5,445,906 A | 8/1995 | Hobson et al. |
| 5,455,126 A | 10/1995 | Bates et al. |
| 5,470,676 A | 11/1995 | Nakano |
| 5,512,147 A | 4/1996 | Bates et al. |
| 5,529,858 A | 6/1996 | Wicker et al. |
| 5,561,004 A | 10/1996 | Bates et al. |
| 5,567,210 A | 10/1996 | Bates et al. |
| 5,612,152 A | 3/1997 | Bates |
| 5,654,084 A | 8/1997 | Egert |
| 6,187,472 B1 | 2/2001 | Shiota et al. |
| 6,284,406 B1 | 9/2001 | Xing et al. |
| 6,703,160 B2 | 3/2004 | Gao |
| 6,753,114 B2 | 6/2004 | Jacobs et al. |
| 6,902,611 B2 | 6/2005 | Muris-Trevino |
| 6,924,060 B2 | 8/2005 | Hamada et al. |
| 6,994,933 B1 | 2/2006 | Bates |
| 7,867,663 B2 | 1/2011 | Park et al. |
| 7,896,063 B2 | 3/2011 | Shimoyama |
| 7,968,232 B2 | 6/2011 | Park et al. |
| 7,972,722 B2 | 7/2011 | Yamada |
| 2002/0010295 A1 | 1/2002 | Nishida |
| 2002/0071989 A1 | 6/2002 | Verma et al. |
| 2003/0064171 A1 | 4/2003 | Burrows et al. |
| 2010/0291431 A1* | 11/2010 | Shih .................. H01M 2/0207 429/159 |
| 2011/0244315 A1* | 10/2011 | Yoon .................. H01M 2/0207 429/176 |

OTHER PUBLICATIONS

PCT Written Opinion of the International Searching Authority for PCT Counterpart Application No. PCT/CA2013/000006, 5 pgs., (dated Feb. 21, 2013).

PCT Notification Concerning Transmittal of International Preliminary Report on Patentability (Chapter I of the Patent Cooperation Treaty) for counterpart PCT Application No. PCT/CA2013/000006, 7 pp., (dated Jul. 17, 2014).

* cited by examiner

THIN FILM ELECTROCHEMICAL CELL WITH A POLYMER DOUBLE SEAL

CROSS-REFERENCE TO RELATED APPLICATIONS

This patent application is a U.S. National Phase Application under 35 U.S.C. §371 of International Application No. PCT/CA2013/000006, filed 7 Jan. 2013, entitled THIN FILM ELECTROCHEMICAL CELL WITH A POLYMER DOUBLE SEAL, which claims the benefit of 35 USC 119(e) to U.S. Provisional Application Ser. No. 61/631,453, filed 5 Jan. 2012, and U.S. Provisional Application Ser. No. 61/631,457, filed 5 Jan. 2012.

SCOPE OF THE INVENTION

This invention relates to thin film electrochemical cells, and more particularly, thin film battery cells having first and second polymer sealing layers.

BACKGROUND OF THE INVENTION

Thin film battery cells are typically heat sealed in soft aluminum/plastic laminate foil pouches. U.S. Pat. No. 6,284,406 discloses a thin film cell battery sealed by a sheet of flexible laminate material having at least one metal foil layer and a layer of an adhesive-like polymeric material. Such a sheet would provide multiple layers, but may not be thick enough to provide sufficient resistance to the undesired diffusion of chemical species in applications such as lithium ion batteries. The sheet provides a single seal, leaving it prone to many problems.

U.S. Pat. No. 5,654,084 discloses an enhanced protective coating to prevent interaction between constituents of the environment and devices that can be damaged by those constituents. The protective coating comprises alternating layers of an organic coating (such as Parylene$^{SM}$) as a diffusion barrier, and a ceramic or metal coating (such as aluminum) as a physical barrier. For thin film battery cells, where diffusion is the primary concern rather than physical breach, the inclusion of a ceramic or metal physical barrier adds unnecessary weight, expense and complexity. Again, laminate foils alone do not provide sufficient protection.

The problems single foil seals are most prone to are:

1. They exhibit poor diffusive resistance. Electrochemical cells, and in particular lithium ion cells, react in an undesirable manner with atmospheric components such as water vapour, oxygen, nitrogen and carbon dioxide, damaging the cell components. In cells comprising a liquid electrolyte, the electrolyte may also diffuse out of the cell.

2. They are generally fragile and are easily nicked or torn. The seal may be breached through mechanical or thermal shocks. This can cause electrolyte leakage, which impairs battery performance and introduces dangerous high voltage connections.

3. The aluminum in the foil may cause voltage leakages. During cell packaging, the foil is generally freshly cut. Not enough time elapses for the aluminum to develop an electrically insulating oxide layer, so conductive pure aluminum is exposed. This may result in voltage leakage or short circuits, particularly at the terminals.

Thus it is desirable to package a cell in such a manner as to minimize contact between the cell components and the external environment.

Most foil-sealed pouch cells are further packaged into prismatic metal enclosures which are welded shut. This addresses many of the problems listed, but is expensive and requires precision tooling. These containers corrode over time due to voltage ingress, eventually rendering them useless.

United States Patent Application Publication No. 2002/0071989 discloses a thin film battery layered with a protective dielectric coating and then covered by a sealing layer comprising epoxy. This results in a cell with a plurality of protective layers, but only one seal. This solitary epoxy seal provides only limited protection against diffusion. With respect to the problems listed above, this arrangement is not a significant improvement over laminate foils. Furthermore, improper epoxy curing processes can lead to degradation of some metals in contact with said epoxy.

U.S. Pat. No. 6,924,060 discloses a sealed battery module wherein a sheet is folded over a row of cells to form a seal. The sheet possesses inserts and elastic pressing members, such that when applied will form an additional seal comprising the inserts and the current collectors. In this manner, the electrolyte seal for the individual battery cases is secured by a double seal, while the rest of the cell has only a single seal. Such a method of sealing cells within a battery module by the use of sheets with inserts applies only to battery modules comprising a plurality of cells arranged in a line, and does not allow for the packaging of individual cells nor variance in geometrical arrangement.

Another challenging aspect of thin film battery cells, as for example lithium ion batteries found in most portable electronic devices, electric vehicles, and other applications, relates to thermal management. High temperatures increase the rate of exothermic intracellular reactions, which increase the rate of heat generation, leading to even higher temperatures. This situation is know as thermal runaway and is damaging to the cell, sometimes leading to combustion or explosion. In addition to destroying the battery, this also poses a safety risk. It should therefore be desirable to include within a lithium ion battery means of dissipating heat to the external environment.

One of the advantages of flat-geometry, pouch type cells is the greater surface area to volume ratio as compared to cylindrical cells, allowing for better heat dissipation. U.S. Pat. No. 6,703,160 proposes to increase the effective surface area of the cell by increasing the outer surface roughness of the battery by rubbing with an abrasive or by indenting the surface to increase the effective surface area.

Another strategy has been to improve convective heat transfer by increasing fluid flow around the cells in a battery pack and including baffles or heat fins. U.S. Pat. Nos. 7,867,663 and 7,896,063 employ these concepts in their disclosures.

Another option is to improve thermal radiation from a cell to its surroundings. The best means of accomplishing this is to increase the effective emissivity of the cell. U.S. Pat. No. 6,703,160 suggests the outer surface of a battery be formed of high emissivity material and that a high emissivity label be applied. High emissivity paints and coatings are also abundant, though they are primarily used in non-battery applications.

A further concern is the temperature distribution within a cell or battery pack. Due to cell geometry, combined with the electrical leads which function as heat sinks, some areas generally exhibit higher temperatures during operation. These higher temperature areas degrade more quickly and impair performance compared to the cooler areas of the cell.

All of the above applications and patents are incorporated herein by reference; but none of these references is admitted to be prior art with respect to the present invention by its mention in the background.

SUMMARY OF THE INVENTION

The present invention has been developed in view of the difficulties in the art noted and described above.

To at least partially overcome these disadvantages, a first objective of the present invention is to provide a thin film electrochemical cell packaging which provides a sufficient seal from the external environment.

A further objective of the present invention is to provide a thin film electrochemical cell packaging which significantly contributes to heat dissipation from the cell and which is capable of favouring heat transfer from certain areas of a cell, while still providing an effective seal to the external environment.

To achieve the above objectives, in a first aspect, the present invention provides a thin film electrochemical pouch cell comprising: an electrode assembly comprising a cathode current collector, a cathode, an electrolyte, an anode, and an anode current collector; a first polymer layer forming a primary seal substantially enclosing the electrode assembly; and a second polymer layer forming a secondary seal covering at least a portion of the first polymer layer.

In a further aspect of the invention, the first polymer layer and the second polymer layer are comprised of two different polymer materials, wherein the first polymer layer forming the primary seal is selected to provide diffusive resistance to a first species and the second polymer layer forming the secondary seal is selected to provide diffusive resistance to a second species.

The provision of two polymer sealing layers allows for greater overall thickness which impedes the diffusion of deleterious substances into the cell and inhibits bulk transport of fluid into or out of the cell. Two polymer layers also greatly reduce the likelihood of a tear or hole breaching both layers and penetrating to the electrode assembly of the cell. In addition to the greater thickness, weak points in one layer, a seam or fold for example, would be offset from weak points in the adjacent layer. This results in greater overall structural integrity than a single layer, or even a multilayered laminate foil. Thereby, greater seal integrity is provided and the rate of diffusion of deleterious species across the seal is reduced, resulting in a longer-lasting, better-performing battery cell.

In a further aspect of the invention, the second polymer layer forming the secondary seal covering at least a portion of the first polymer layer comprises embedded particles to increase a thermal conductivity of the second polymer layer.

The inclusion of embedded particles in the second polymer layer provides better heat transfer characteristics and creates a more uniform temperature distribution in the cell. The heat-dissipating polymer seal may be applied to the entire cell or only to part of the cell such that less heat is drawn away from cool regions of the cell, such as where the electrical tabs protrude. In this manner the seal may be used to promote uniform temperature distribution within the cell or battery formed there from.

Further aspects of the invention will become apparent upon reading the following detailed description and drawings, which illustrates exemplary embodiments of the present invention.

BRIEF DESCRIPTION OF THE DRAWINGS

Reference may now be had to the following detailed description taken together with the accompanying drawings in which.

DETAILED DESCRIPTION OF THE INVENTION

Figure 2:
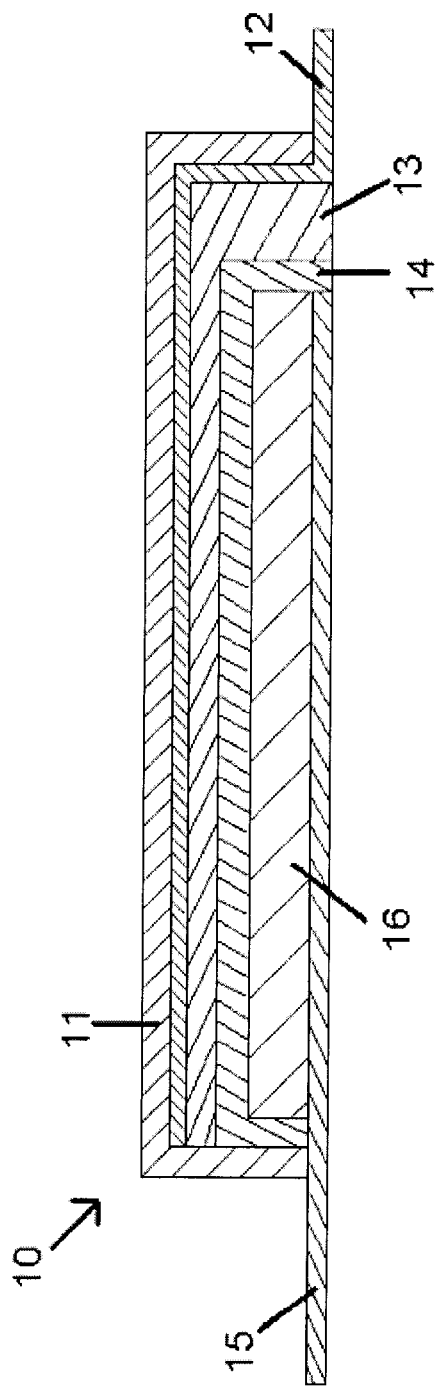
FIG. 2 shows a cross-sectional side-view of an electrode assembly for a thin film electrochemical cell.

Reference may now be made to FIG. 2 which illustrates an electrode assembly 10 of a thin film electrochemical cell. The electrode assembly 10 includes a cathode current collector 15, a cathode 16, an electrolyte 14, an anode 13 and an anode current collector 12. The electrode assembly 10 further includes a passivation layer 11, which may not be included in alternate embodiments. Alternate embodiments may further comprise separator layers within the electrode assembly 10, which are not pictured in the preferred embodiment shown. The cathode 16 is preferably made of a lithium intercalation compound, preferably a metal oxide such as $LiNiO_2$, $Li_xMn_2O_4$ or $LiCoO_2$. The electrolyte 14 is preferably a composite polymer electrolyte as disclosed in U.S. Pat. No. 6,753,114, which is specifically incorporated herein by reference. Alternate embodiments may include other solid or liquid electrolytes. The anode 13 is preferably made of a tin compound, such silicon-tin oxynitride, SiSnON, when used in lithium ion batteries, or other suitable material such as lithium metal, zinc nitride, tin nitride or graphite. The cathode current collector 15 and the anode current collect 12 are preferably made of copper, nickel, or nickel-coated copper.

Figure 3:
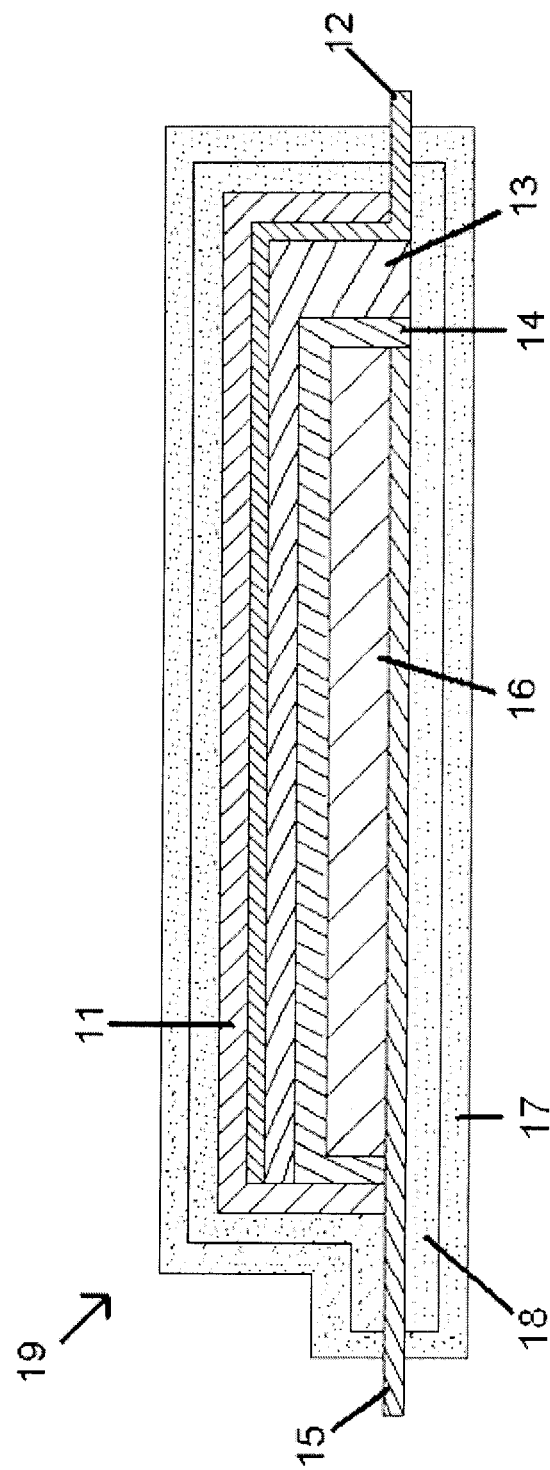
FIG. 3 shows a cross-sectional side-view of a first embodiment of a thin film electrochemical cell in accordance with of the present invention.
Figure 4:
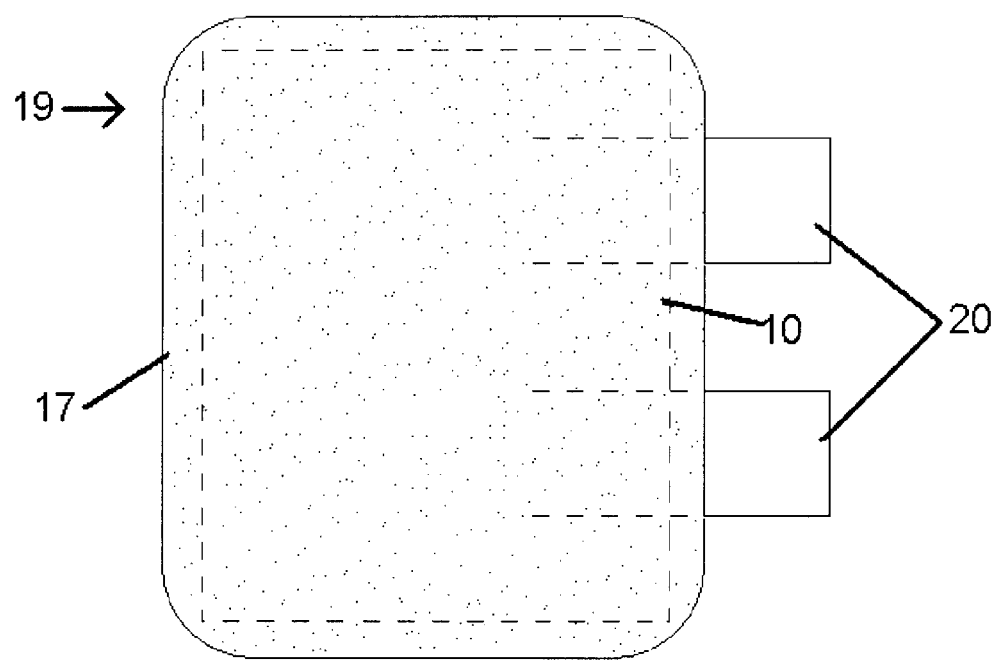
FIG. 4 shows a top view of the thin film electrochemical cell shown in FIG. 3.

FIGS. 3 and 4 illustrate a first preferred embodiment of a thin film electrochemical cell 19 embodying principles of the invention. In the preferred embodiment the cell 19 is a rechargeable lithium ion battery cell, but the present invention is not limited to lithium ion cells and other embodiments may include other categories of thin film cells, both rechargeable and non-rechargeable.

The cell 19 includes the electrode assembly 10 covered by a first inner metal-polymer laminate layer 18 forming a primary seal, which in turn is covered by a second outer polymer layer 17 forming a secondary seal. Preferably each layer 18, 17 are each between 1-3 µm in thickness, and more preferably 2 µm in thickness. Those practiced in the art will recognize that, in order to minimize mass transfer across the layers 18, 17, the thickness must be maximized, while balancing other design features such as cell weight and volume, which seek to minimize thickness. Preferably, the layer 17 is composed of polypropylene and the inner layer 18 is made from an aluminum/polymer laminate. Depending on the exact cell materials used and the environment to which the cell 19 will be subjected throughout its active life cycle, alternate compositions and combinations thereof may be used for the layers 18, 17.

To minimize diffusion of deleterious substances into and out of the thin film battery cell 19, the material of layers 18, 17 are selected to minimize damage to the electrode assembly 10 by providing the greatest diffusive resistance to the most harmful and most abundant species surrounding the cell's 19 external environment, while still providing a sufficient physical and electrical seal.

Figure 1:
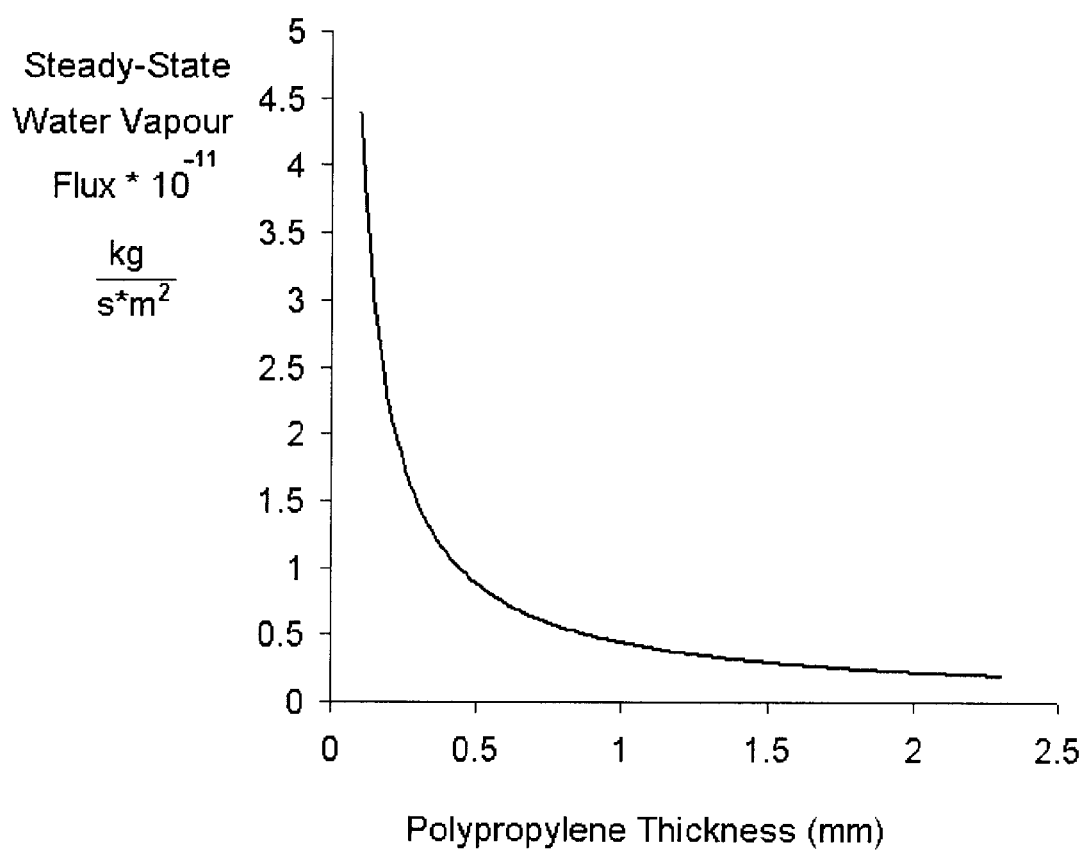
FIG. 1 shows a graph illustrating the relationship of steady-state diffusive flux to layer thickness, in this case water vapour moving through polypropylene at 25° C., assuming saturated vapour at the outer surface of the polypropylene layer and no vapour at the inner surface.

The rate of diffusion of one substance through another is governed by Fick's Law, which states that the rate of diffusion is inversely proportional to the distance. For example, FIG. 1 shows that, in the case of diffusion of water vapour through polypropylene, the steady-state flux decreases significantly as the thickness of a polypropylene layer increases. Thus increasing the thickness of a polymer layer will significantly decrease the flux of deleterious substances through said layer. Adding a second layer of equal thickness comprised of the same material is effectively the same as doubling the thickness of the first layer, with respect to diffusion. Two layers of polypropylene with a thickness of 2 µm each would have the same steady-state vapour flux as one layer of polypropylene with a thickness of 4 ($1.1 \times 10^{-9}$ $kgs^{-1}$ $m^{-2}$); the flux would be decreased by half compared to that of a single 2 µm layer ($2.2 \times 10^{-9}$ $kgs^{-1}$ $m^{-2}$). Added resistance is provided at the interface, which would become more significant as the thickness of the layers decreased. Thus a secondary seal provides significant advantages to a single seal.

In a more preferred embodiment of the invention, the first inner laminate polymer layer 18 forming the primary seal is selected to provide diffusive resistance to a first species surrounding the cell's 19 external environment and the second outer polymer layer 17 forming the secondary seal is selected to provide diffusive resistance to a second species surrounding the cell's 19 external environment. By selecting two different materials for the two layers 18, 17, better targeting of multiple specific species may be achieved. For example, the laminate polymer layer 18 may be composed of a material with a high resistance to water, but a low resistance to carbon dioxide. This layer 18 could then be paired with an outer layer 17 composed of a polymer with a low resistance to water but a high resistance to carbon dioxide. By selecting layers 18, 17 of differing diffusivity, the invention minimizes the overall diffusion of harmful species to a greater extent than allowed by a single type of polymer. Alternately, one layer could be selected to provide superior mechanical or other properties.

The thin film electrochemical pouch cell 19 has a generally rectangular, flat-geometry shape having opposing long and short edges. As shown in FIG. 4, the polymer layer 17 may be provided to entirely encase the electrode assembly 10 and the inner laminate layer 18. Such an arrangement minimizes the area of seams or surface edges of the seals, which are the areas most prone to leakage. Two current-conducting tabs 20 are provided and arranged along a same long edge of the cell 19

Figure 5:
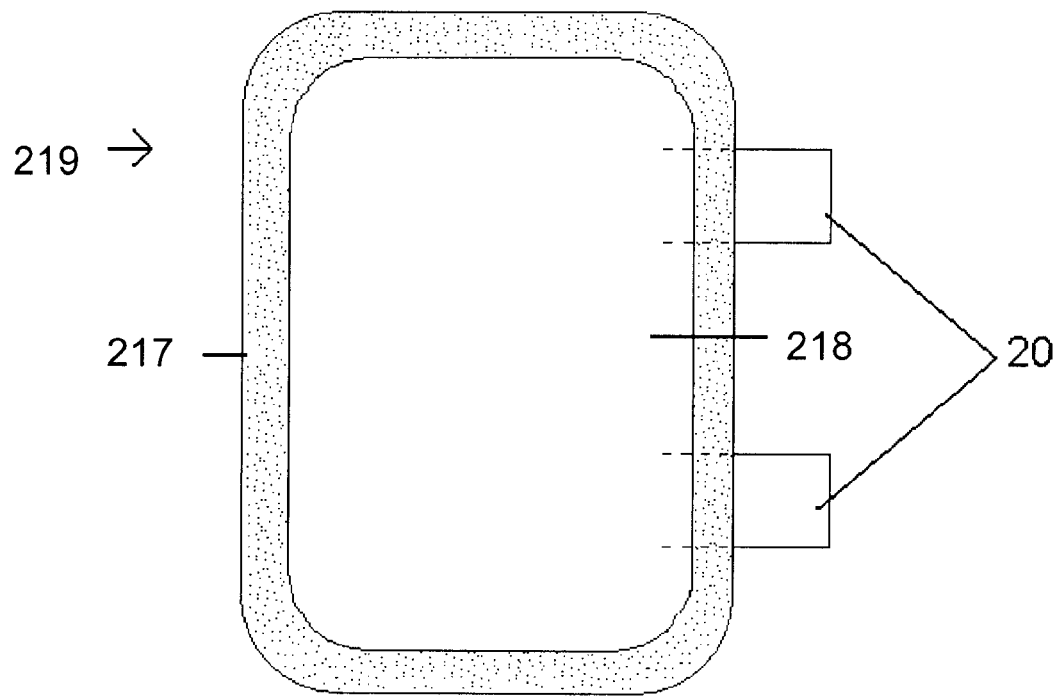
FIG. 5 shows a top view of a second embodiment of the thin film electrochemical cell in accordance with the present invention, in which the second polymer layer is provided about only the perimeter of the first polymer layer.
Figure 6:
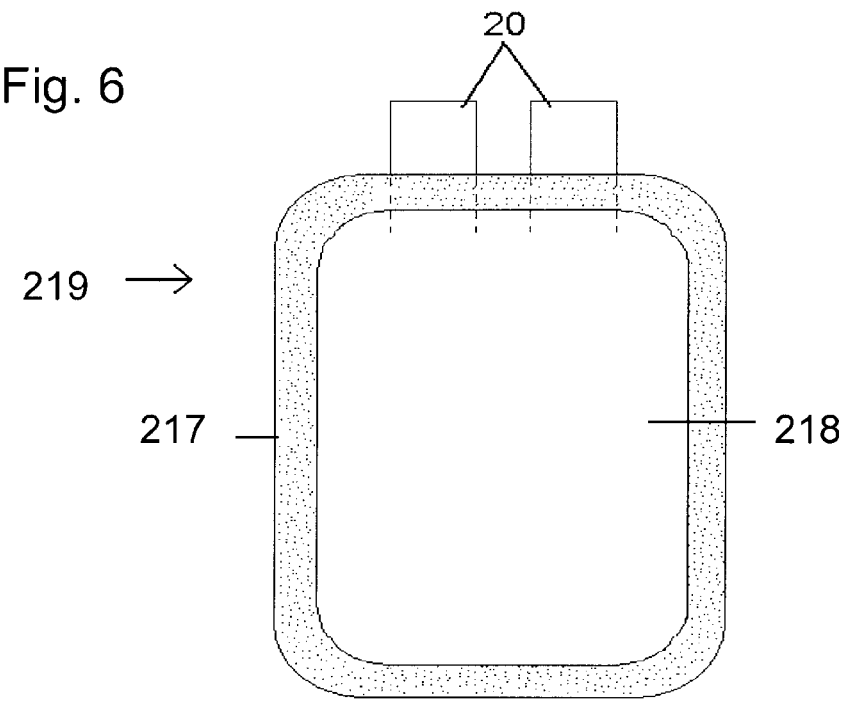
FIG. 6 shows an alternative variation of the cell shown in FIG. 5, where electrical tabs are provided on the same short edge of the cell.
Figure 7:
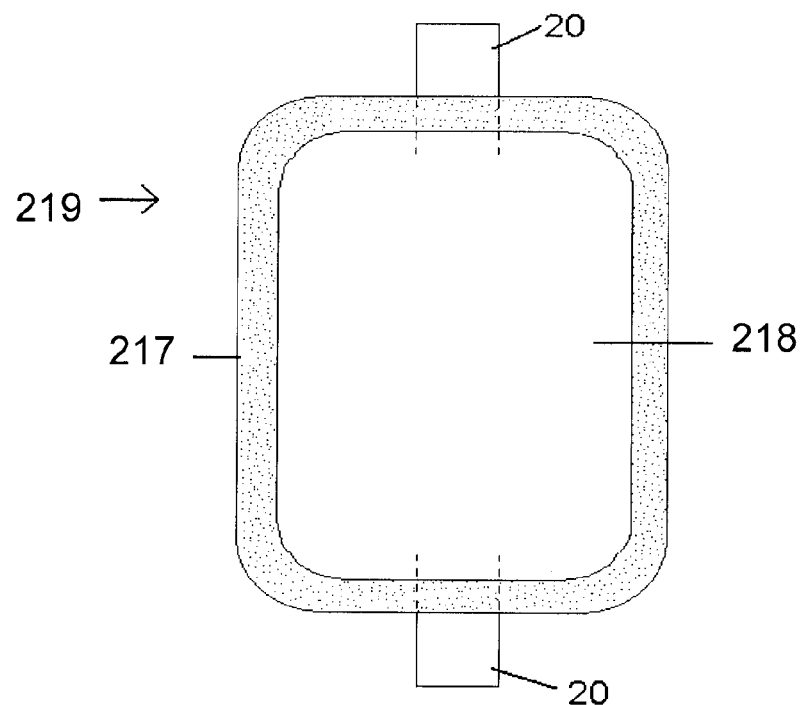
FIG. 7 shows a further alternative variation of the cell shown in FIG. 5, where the electrical tabs are located on opposing edges of the cell.

Reference may now be made to FIG. 5 which illustrates a second embodiment of a cell 219 in accordance with the present invention. In the second embodiment the electrode assembly 10 is placed between a folded sheet of laminate foil 218, which is sealed together, and a polymer layer 217 is provided to only around the sealed outer perimeter edges of the laminate foil sheet 218. In such an arrangement the polymer layer 217 may be adhere to an area between 2-3 mm inward from the outer perimeter edge of the laminate foil sheet 218 and may overlay the sheet 218 by another 2-3 mm. This alternative embodiment 219 shown in FIG. 5 does not provide as rigorous a seal as that shown in FIG. 4, but one skilled in the art will recognize cost and weight savings while providing a targeted double-seal effectively applied to the most vulnerable regions of the cell 219. Diffusion, physical breaches and exposure to pure aluminum from the laminate layer 218 are most likely to occur in these regions. The two current-conducting tabs 20 can be seen, with both located along the same long edge of the cell 219. Alternatively, both tabs 20 may be located on the same short edge of the cell 219, as exemplified in FIG. 6 or the tabs 20 may be located at opposite ends of the cell 219 as shown in FIG. 7. In arrangements where the tabs 20 are located on the same edge of the cell 219, the foil sheet 218 is folded over the electrode assembly 10 of the cell 219 and sealed along the edges that do not contain the tabs 20. In arrangements where the tabs 20 are located on opposite edges of the cell 219, the foil sheet 218 is folded over the electrode assembly 10 of the cell 219 and sealed along all edges.

The presence of two sealing layers 18, 17 and 218, 217 increases the overall seal thickness, whereby a reduction in rate of diffusion is achieved, both of external components into the cell 19, 219 and in the case of a cell comprising a fluid electrolyte, of electrolyte 14 out of the cell 19, 219. The use of multiple polymer combinations can further enhance the diffusive resistance of the cell 19, 219. Two layers also greatly reduce the likelihood of an opening between the cell 19, 219 and the external environment, such that greater protection is created against bulk fluid transport.

Figure 8:
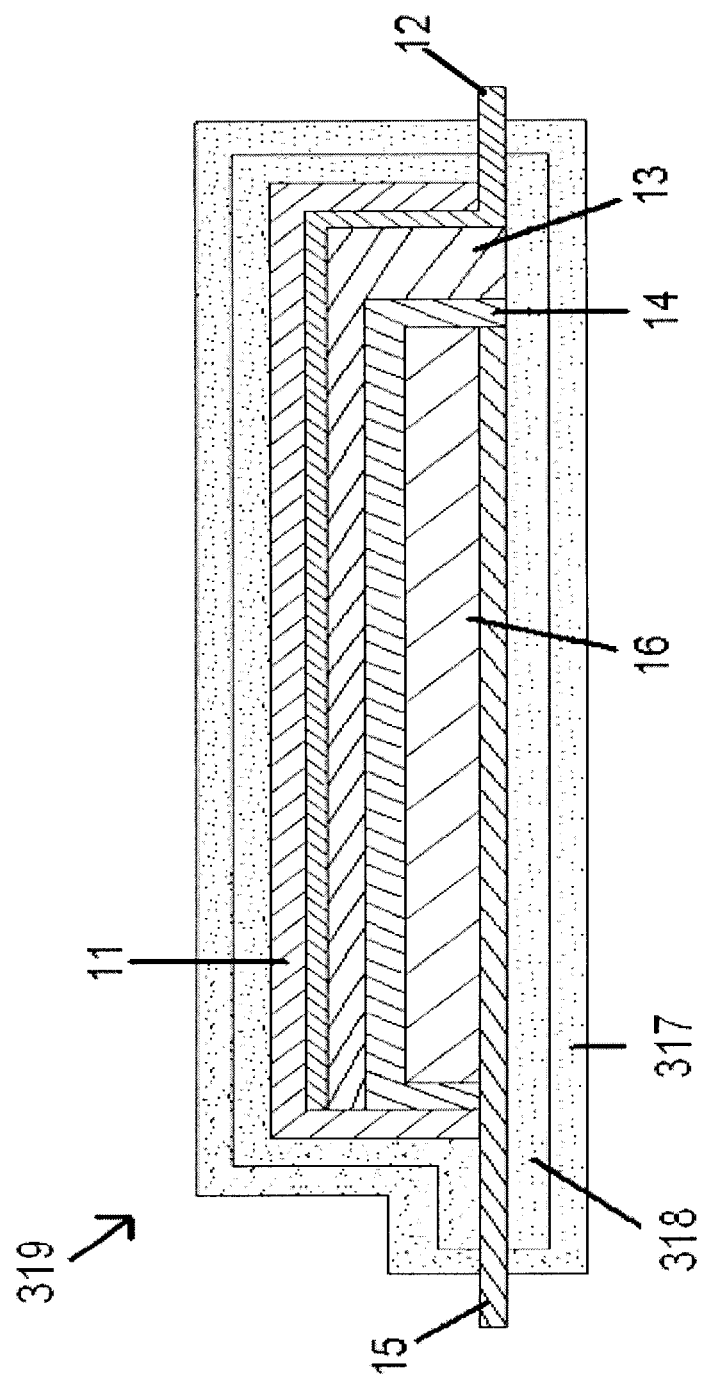
FIG. 8 shows a cross-sectional side-view of a third embodiment of a thin film electrochemical cell in accordance with of the present invention.
Figure 9:
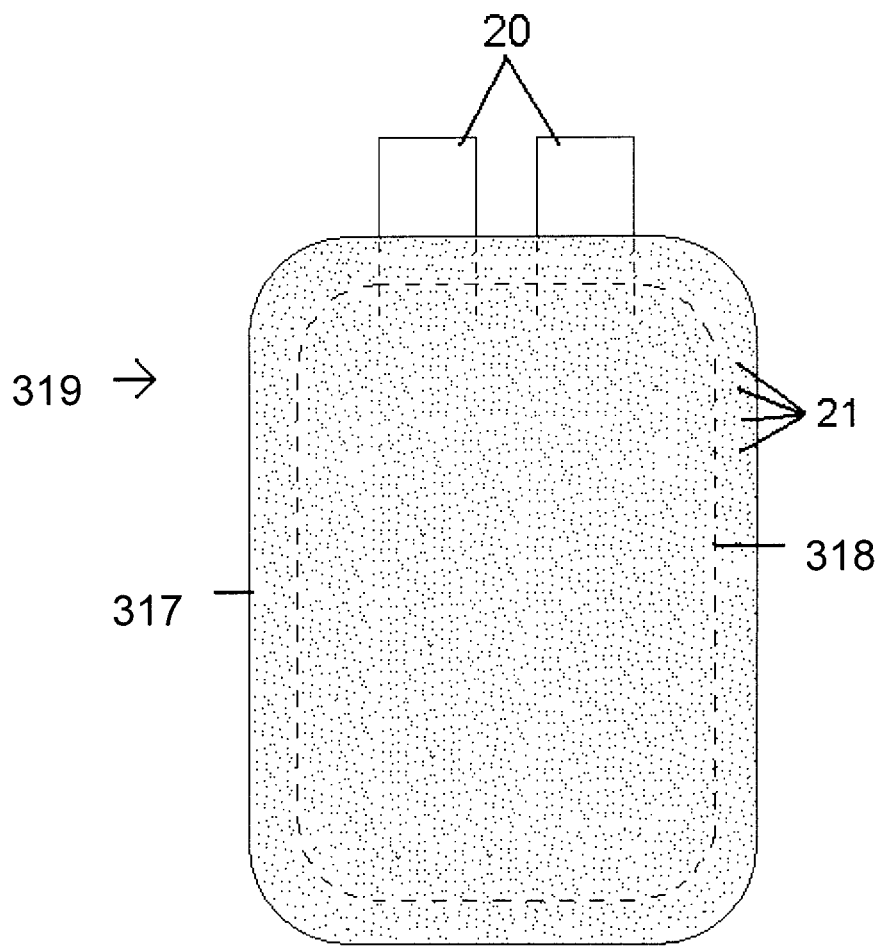
FIG. 9 shows a top view of the thin film electrochemical cell shown in FIG. 8.
Figure 10:
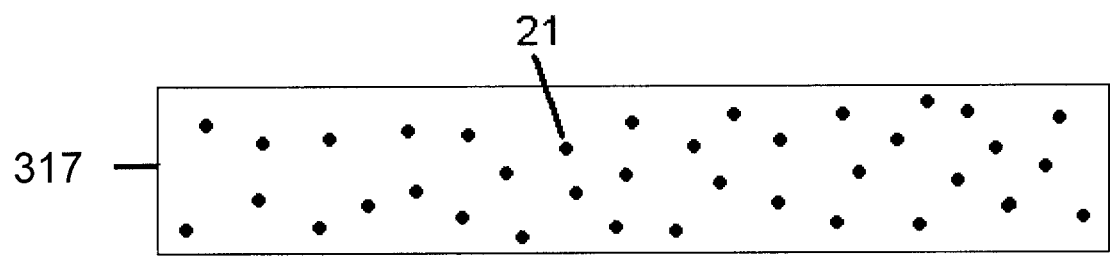
FIG. 10 shows a magnified cross-sectional view of the second polymer layer of the thin film electrochemical cell shown in FIG. 8.

Reference may now be made to FIGS. 8, 9 and 10 which illustrate a third preferred embodiment of a thin film electrochemical pouch cell 319 embodying principles of the invention. Like references will be used to illustrate similar features.

The cell 319 includes an electrode assembly 10 having a cathode current collector 15, a cathode 16, an electrolyte 14, an anode 13 and an anode current collector 12. A passivation layer 11 is provided, which may not be included in alternate embodiments. Alternate embodiments may further comprise separator layers within the cell 319, which are not pictured in the preferred embodiment. The cell 319 is encased within a first inner metal-polymer laminate layer 318, which in turn is encased in a second outer heat-dissipating polymer layer 317.

The heat-dissipating polymer layer 317 is a composite material comprising a plurality of small particles 21 embedded therein. The polymer layer 317 is preferably polyurethane or polypropylene, and the particles 21 are ceramic and preferably made of aluminum nitride, boron nitride or graphite. The solid content of the particles 21 is preferably greater than 5%. The presence of the embedded particles 21 increases the thermal conductivity of the layer 317, whereby more heat is removed from the covered portion of the cell 319. The particles 21 also decrease the electrical conductivity of the layer 317, yielding a more effective electric seal for the cell 319.

In the embodiment shown in FIG. 9, the cell 319 is entirely encapsulated by the heat-dissipating polymer layer 317. This embodiment provides maximum surface area of the heat-dissipating layer 317 and thus maximum heat transfer to the cell's surroundings. The electrically conducting tabs 20 are provided on the same short edge of the cell 319 and are generally flat, metallic protrusions, and act much like heat fins. Thus it will be obvious to those skilled in the art that relatively large quantities of heat are removed from the cell through the tabs 20, resulting in localized regions of relatively lower temperature.

Figure 11:
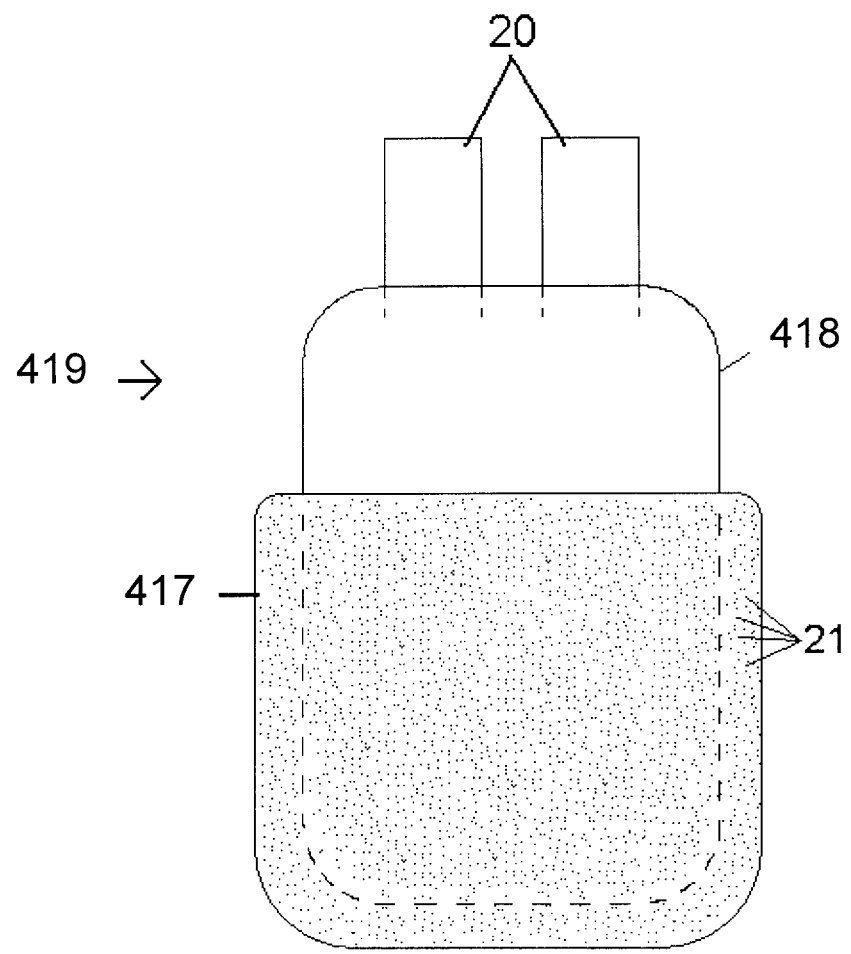
FIG. 11 shows a top view of a fourth embodiment of a thin film electrochemical cell in accordance with the present invention.

Reference may now be made to FIG. 11 which illustrates a forth preferred embodiment of a thin film electrochemical pouch cell 419 embodying principles of the invention. It is an object of the fourth embodiment 419 to selectively produce more uniform temperature distribution across the cell 419. As such, FIG. 11 displays an embodiment of the invention including a non-uniform second polymer layer 417 wherein the area around the tabs 20 is not covered by the non-uniform layer 417. Thus the layer 417 draws more heat away from the portions of the cell's 419 spaced away from the tabs, resulting in more even temperature across the cell 419. The non-uniform polymer layer 417 may be provided to varying coverage over the first polymer layer, as desired. For example, the heat-dissipating seal 417 seen in FIG. 11 could taper, such that it would be thicker at the edge of the cell 419 spaced away from the tab 20 and become thinner as the layer 417 approaches the tabs 20. In battery packs containing a plurality of cells it is common for some cells to operate at higher temperatures than others. By providing cells having non-uniform polymer layer 417 coverage, more even battery pack temperatures can be achieved by selectively placing cells with either thicker heat-dissipating polymer layers 417 or greater polymer layer 417 coverage in hot zones of the battery pack. Thus by applying a non-uniform polymer layer 417 coverage, a more even temperature distribution is achieved in both individual cells and in batteries containing a plurality of cells.

The heat-dissipating seal 317, 417 may be combined with other known strategies for improving heat transfer. The heat-dissipating layer 317, 417 may be of such composition that the outer surface is rough and the effective surface area is increased. The heat-dissipating layer 317, 417 may also be comprised of a material having a high emissivity or be partially covered by a special heat-dissipating label in order to increase heat transfer through radiation. Use of multiple techniques allows maximum heat exchange between the cell 319, 419 and the external environment.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

It is to be further understood that the invention is not restricted to the particular embodiments described and illustrated herein. Rather, the invention includes all embodiments, which are functional, electrical or mechanical equivalents of the specific embodiments and features that have been described and illustrated herein.

We claim:

1. A thin film electrochemical pouch cell comprising:
    an electrode assembly comprising a cathode current collector, a cathode, an electrolyte, an anode, and an anode current collector;
    a first polymer layer forming a primary seal area substantially enclosing the electrode assembly; and
    a second polymer layer forming a secondary seal area covering at least a portion of the first polymer layer,
    wherein the secondary seal area extends along the primary seal area, and
    wherein the second polymer layer is a heat-dissipating polymer layer that comprises embedded particles to increase a thermal conductivity of the second polymer layer.

2. The cell according to claim 1, wherein the first polymer layer comprises a metal-polymer laminate foil having at least one metal layer and at least one polymer layer.

3. The cell according to claim 2, wherein the at least one metal layer comprises aluminium.

4. The cell according to claim 1, wherein the second polymer layer comprises one of polypropylene and polyurethane.

5. The cell according to claim 1, wherein the first polymer layer and the second polymer layer are comprised of two different polymer materials.

6. The cell according to claim 5, wherein the first polymer layer forming the primary seal area is selected to provide diffusive resistance to a first species and the second polymer layer forming the secondary seal area is selected to provide diffusive resistance to a second species.

7. The cell according to claim 1, wherein the cell is selected from one of a lithium ion cell, a primary battery cell and a secondary battery cell.

8. The cell according to claim 1, further comprising one of a sealed reservoir and a vacuum gap spaced between the first polymer layer and the second polymer layer.

9. The cell according to claim 1, further comprising a third polymer layer sealed overtop the second polymer layer.

10. The cell according to claim 1, wherein the electrode assembly is encased in the first polymer layer and the second polymer layer completely envelops the first inner polymer layer.

11. The cell according to claim 1,
    wherein the cell is rectangular shaped and further comprises two electrically conductive tabs; and
    wherein the two electrically conductive tabs are arranged on one of a same short edge of the rectangular cell, a same long edge of the rectangular cell and on diametrically opposing edges of the rectangular cell.

12. The cell according to claim 11, wherein the first polymer layer is sealed along all outer perimeter edges.

13. The cell according to claim 1, wherein the first polymer layer comprises a sheet folded over itself to encompass the electrode assembly and being sealed alone one or more outer perimeter edges.

14. The cell according to claim 1, wherein said first polymer layer and second polymer layers are about 2 µm in thickness.

15. The cell according to claim 1, wherein the embedded particles are composed of a ceramic material.

16. The cell according to claim 15, wherein the ceramic material is one of aluminum nitride, boron nitride and graphite.

17. The cell according to claim 1, wherein the embedded particles increase an electrical resistivity of the second polymer layer.

18. The cell according to claim 1, wherein the embedded particles are present in concentrations greater than 5%.

19. The cell according to claim 1, wherein an outer surface of the second polymer layer has an emissivity greater than about 0.9.

20. The cell according to claim 1, wherein the embedded particles increase a surface roughness of the second polymer layer.

21. The cell according to claim 1, wherein the second polymer layer is a non-uniform polymer layer, the non-uniform polymer layer being applied to selected regions covering the first polymer layer to promote heat transfer in the selected regions.

22. The cell according to claim 21, wherein the selected regions are spaced away from the electrically conductive tabs.

23. The cell according to claim 22, wherein the non-uniform polymer layer comprises at least one of a variation in thickness of the non-uniform polymer layer and a variation in coverage over the first polymer layer.

24. A battery comprising a plurality of cells, wherein each of the plurality of cells is a thin film electrochemical pouch cell comprising:
  an electrode assembly comprising a cathode current collector, a cathode, an electrolyte, an anode, and an anode current collector;
  a first polymer layer forming a primary seal area substantially enclosing the electrode assembly; and
  a second polymer layer forming a secondary seal area covering at least a portion of the first polymer layer;
  wherein at least one of the plurality of cells comprises a non-uniform second polymer layer having a variation in one of thickness and coverage over the first polymer layer to promote uniform temperature distribution across the battery,
  wherein the second polymer layer is a heat-dissipating polymer layer that comprises embedded particles to increase a thermal conductivity of the second polymer layer, and
  wherein the secondary seal area extends along the primary seal area.

25. The battery according to claim 24, wherein a heat-dissipating label is located on the outer surface of the battery.

26. The battery according to claim 11, wherein the two electrically conductive tabs are arranged on one of a same short edge of the rectangular cell and a same long edge of the rectangular cell.

* * * * *